United States Patent Office 3,166,481
Patented Jan. 19, 1965

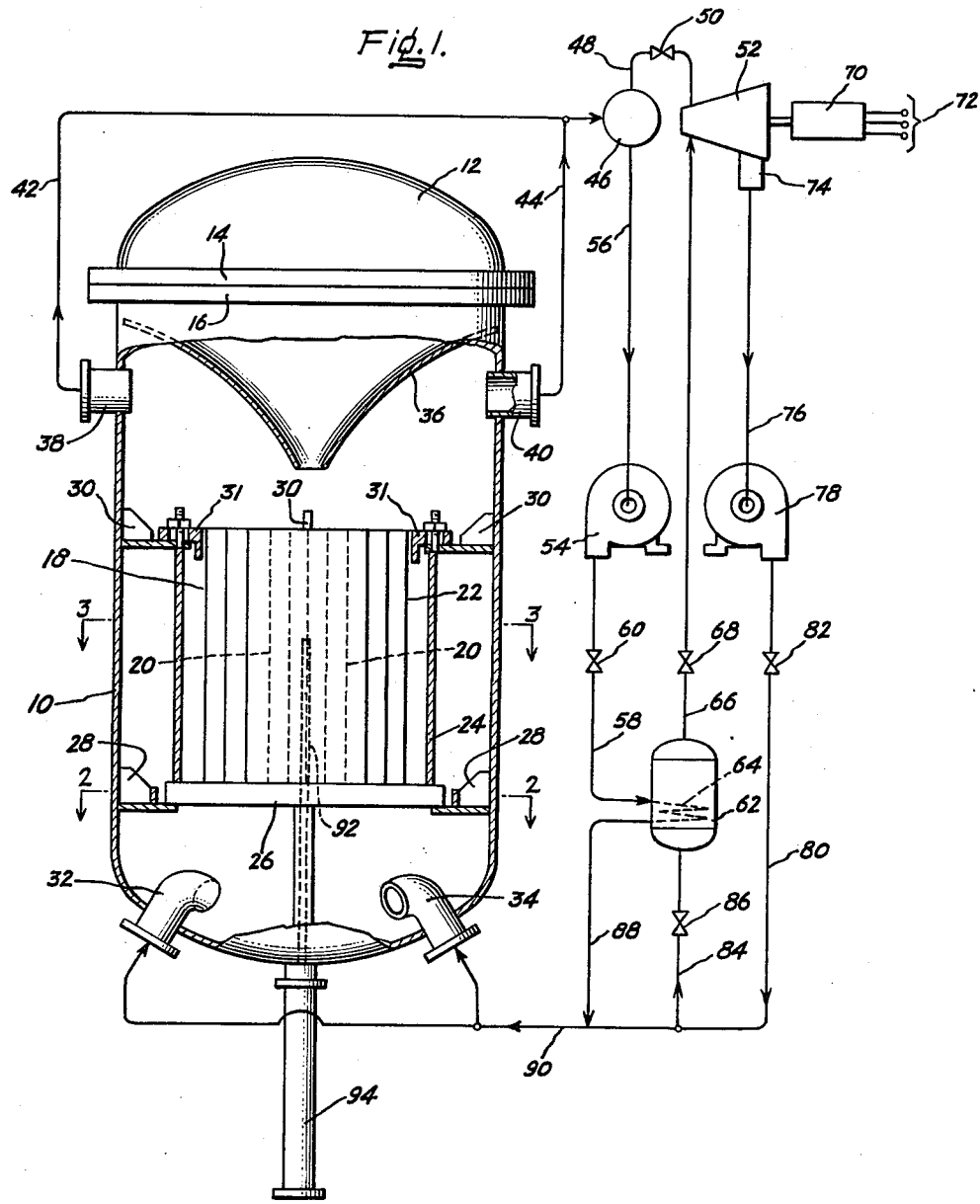

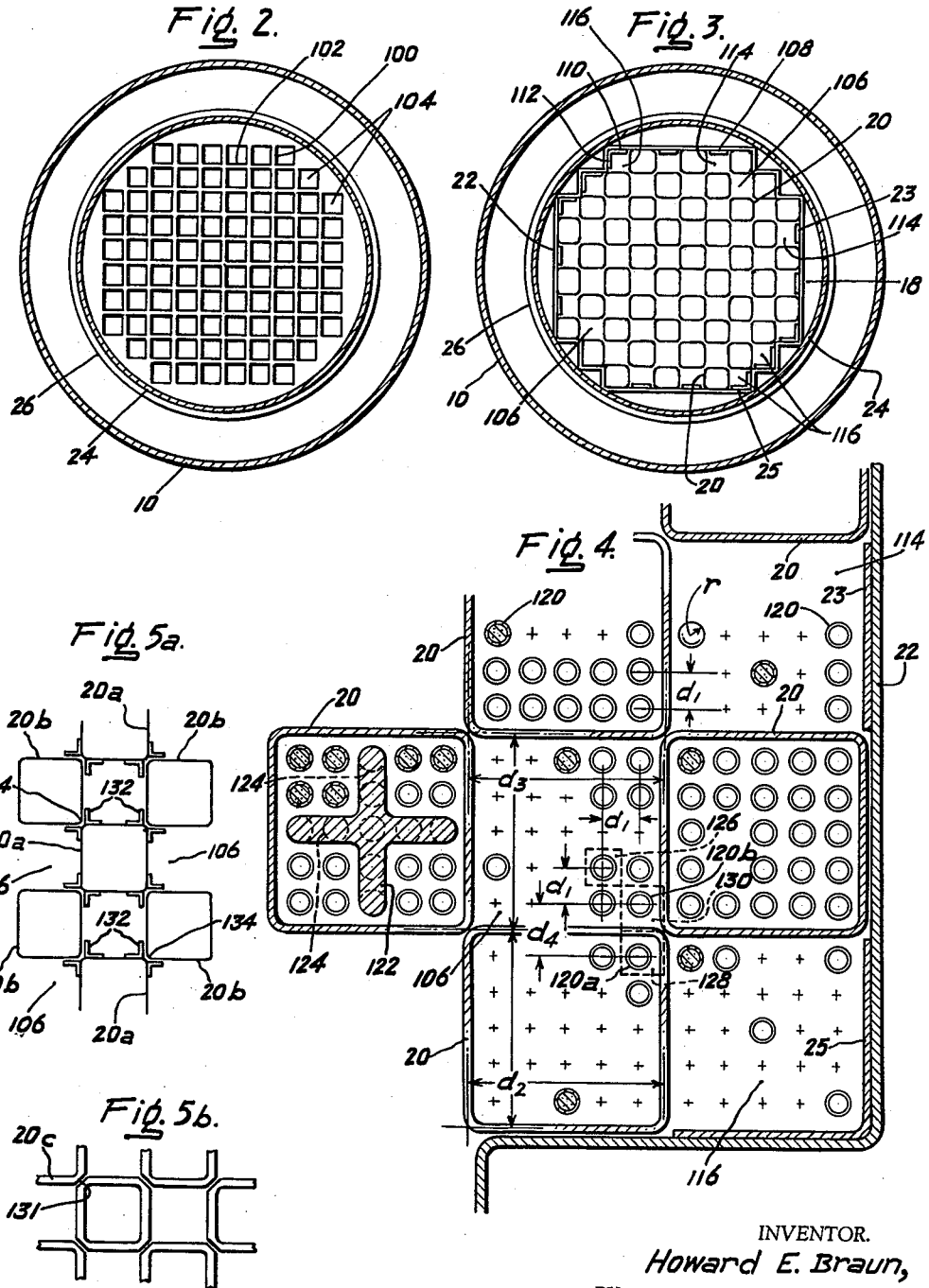

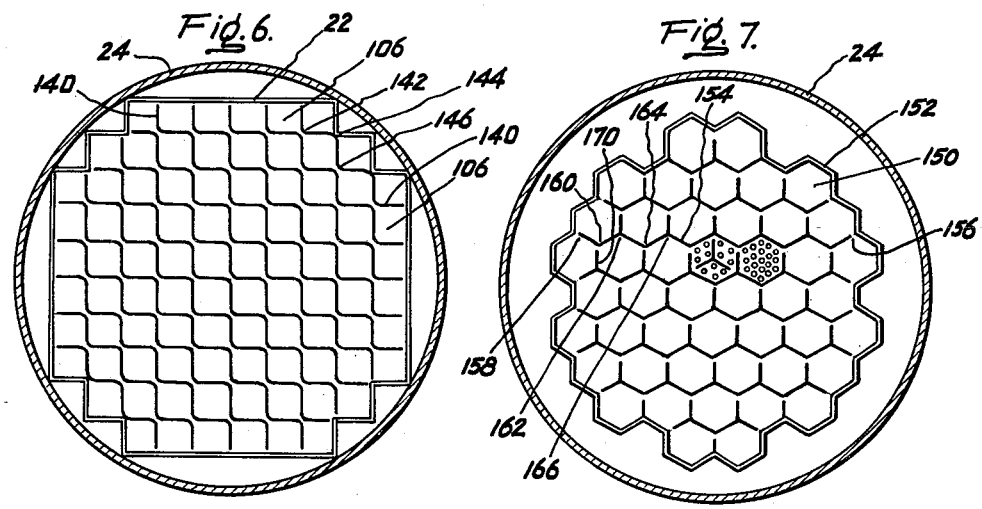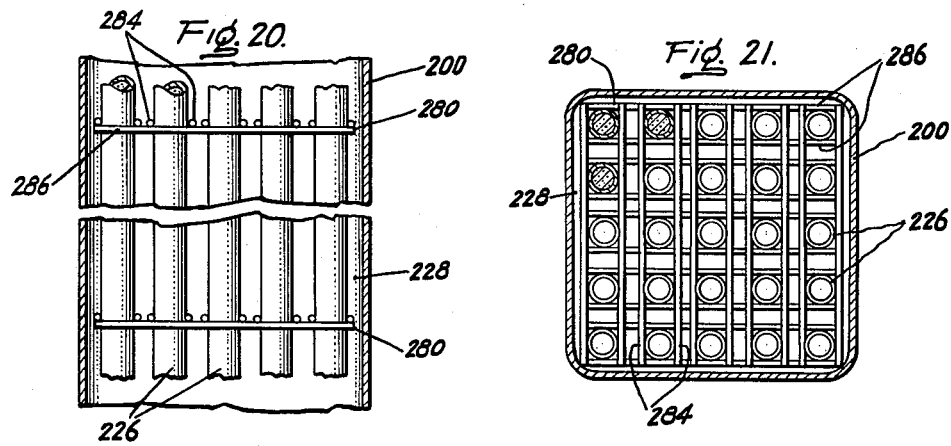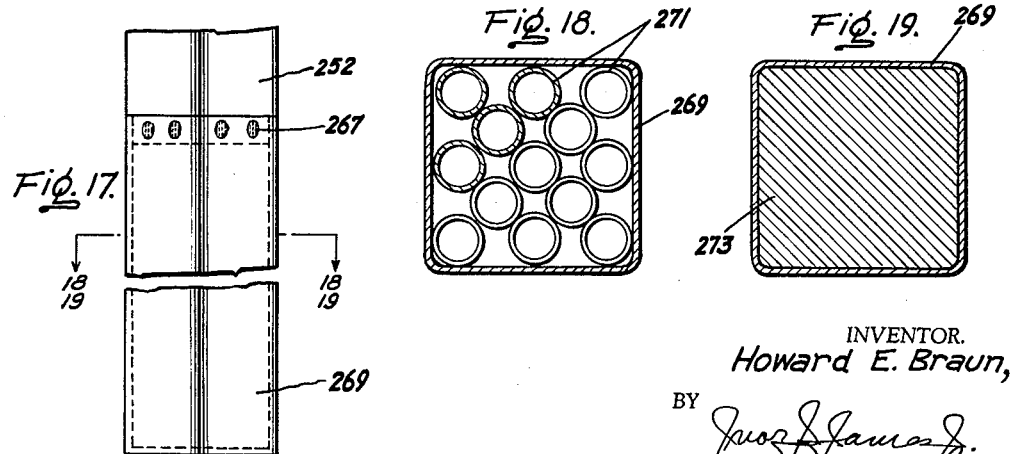

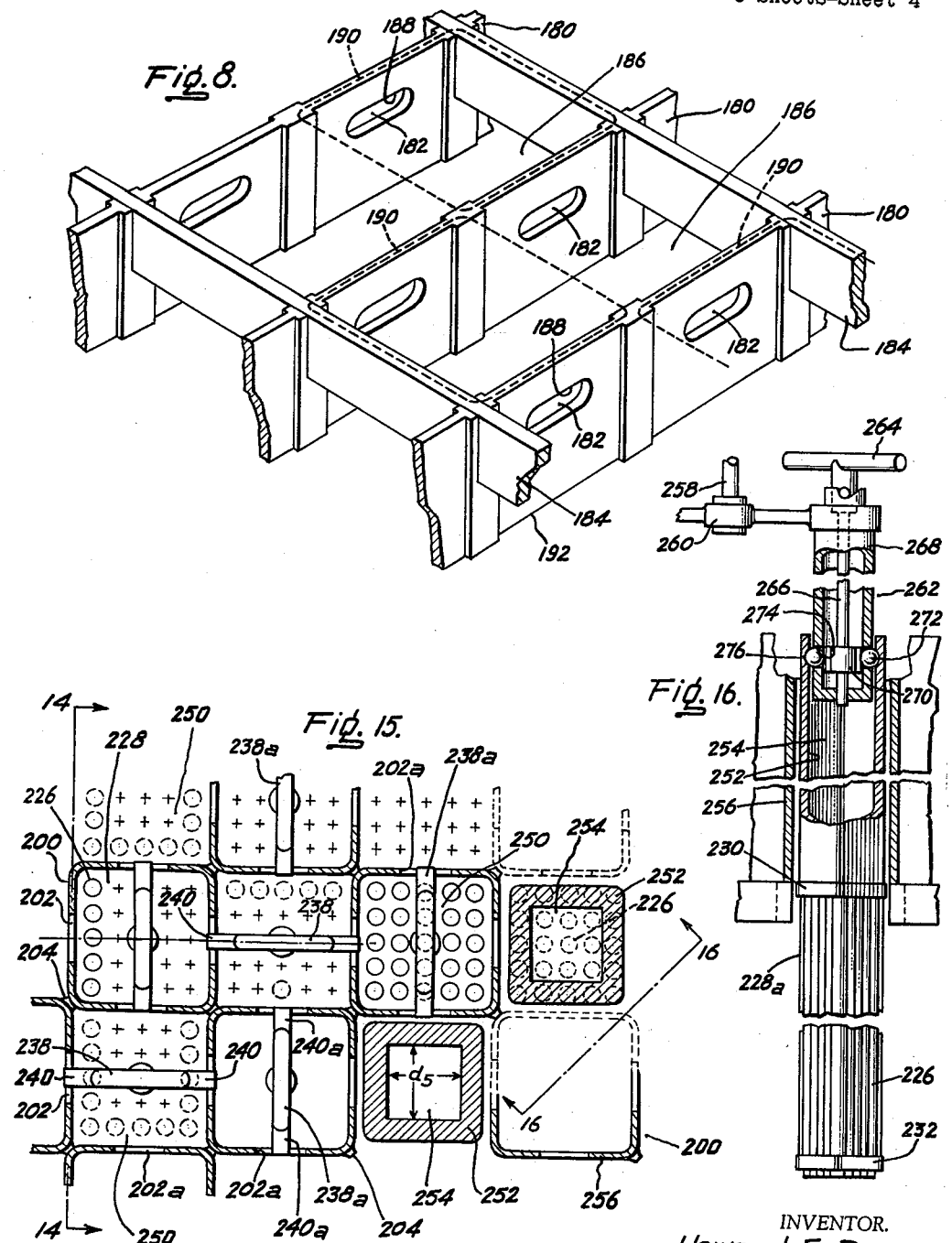

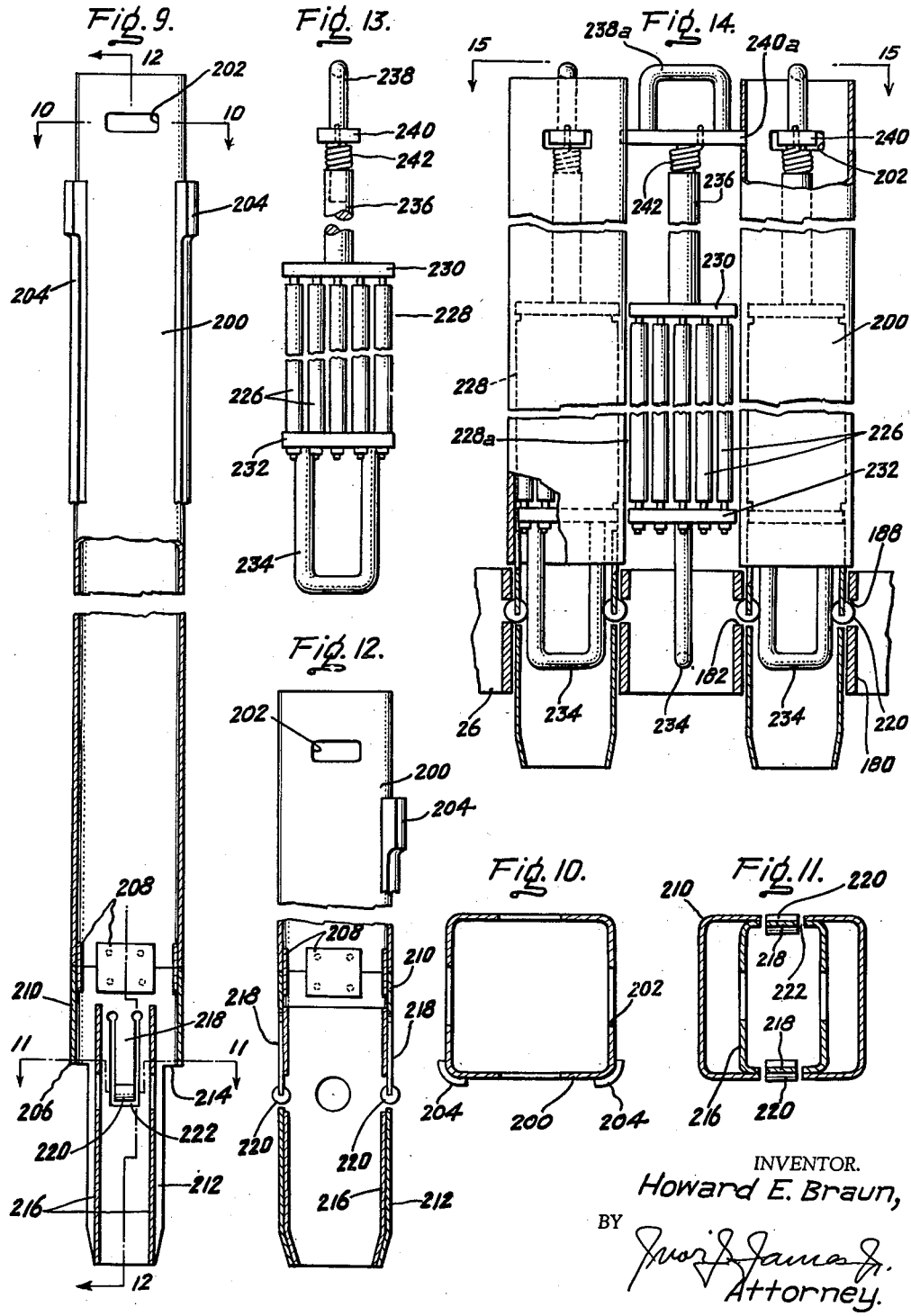

3,166,481
HETEROGENEOUS NUCLEAR POWER REACTOR
CORE STRUCTURE
Howard E. Braun, San Jose, Calif., assignor to General
Electric Company, a corporation of New York
Filed Mar. 18, 1960, Ser. No. 15,965
10 Claims. (Cl. 176—50)

This invention relates to the conversion of mass to energy in a nuclear fission reactor, and it more specifically relates to a new and improved liquid moderated nuclear power reactor in which nuclear energy is released at substantially increased power densities.

The release of large amounts of energy through nuclear fission reactions is now quite well known. In general, a fissionable atom, such as $U^{233}$, $U^{235}$, or $Pu^{239}$, absorbs a neutron in its nucleus and undergoes a nuclear disintegration. This produces on the average, two fission products of lower atomic weight and great kinetic energy, and usually two or three fission neutrons also of high energy. For example, the fission of $U^{235}$ produces a light fission product and a heavy fission product with mass numbers ranging between 80 and 110 and between 125 and 155 respectively, and an average of 2.5 fission neutrons. The energy release approaches about 200 mev. (million electron volts) per fission.

The kinetic energy of the fission products is quickly dissipated in the fuel material containing the fissionable atoms, and in other ambient material, as heat. If during this fission process there is on the average one net neutron remaining which induces a subsequent fission, the fission reaction becomes self-sustaining and the heat generation is continuous. The heat is removed by passing a coolant through heat exchange relationship with the fuel and a load or heat sink. The reaction may be continued as long as sufficient fissionable material remains in the system to override the effects of the fission products which will be produced during operation.

Useful mechanical or electrical energy can be generated in a nuclear reactor power plant through conversion of the thermal energy released in the foregoing neutron-induced nuclear fission reactions. This energy release involves a chain reacting assembly or reactor core containing nuclear fuel, a neutron moderator usually present in the assembly to thermalize the fission neutrons and increase the probability of subsequent fission capture of these neutrons in the fuel, means for passing a reactor coolant through heat exchange relationship with the assembly, and means for the control of the coolant flow and the assembly operating conditions to produce directly or indirectly a heated working coolant. In some cases the neutron moderator and the reactor coolant are combined in a single fluid such as light water (natural isotopic mixture of $H_2O$ and $D_2O$) or heavy water (essentially pure $D_2O$), hydrocarbonaceous organic liquids such as diphenyl, the isomeric terphenyls, naphthalene, anthracene, phenanthrene, and the like. The working fluid referred to previously may be different from or the same as the reactor coolant passed through the chain reacting assembly. In any event it is supplied to a suitable prime mover in order to generate the mechanical or electrical energy.

Nuclear power reactors of many kinds are extensively described in the literature. For example, volume 3, entitled "Power Reactors" of the Proceedings of the International Conference on the Peaceful Uses of Atomic Energy (1955), and volumes 8 and 9, entitled "Nuclear Power Plants" of the Proceedings of the Second United Nations International Conference on the Peaceful Uses of Atomic Energy (1958), described a number of different power reactor types.

High nuclear reactor power plant efficiencies are favored by the operation of the chain reacting assembly at the highest possible power density, that is, operation of the reactor core so that it generates and releases thermal energy to the reactor coolant at the highest feasible rate. These rates are customarily expressed in terms of kilowatts per liter of reactor core volume. There are, however, limits on the power density which can be maintained in a given chain reacting assembly. Four of the most significant limits are (1) the melting point of the fuel material which, if exceeded, is thought by some to cause fission product release within the fuel element, (2) the maximum permissible flow rates of the reactor coolant through the core, (3) the maximum heat transfer rate between the fuel and the coolant, and (4) the fraction of the core volume available to contain fuel assemblies after deduction from the total core volume of the volume devoted to control poison elements and structural materials. The second and third limits are, of course, related to one another. None of the first three limits is reached simultaneously at all points throughout the entire reactor core. In fact, the output of a reactor core can be limited to a fixed relatively low value due to the occurrence of central melting, for example, in a particular fuel element while all or most all other fuel elements operate with central temperatures far below the melting point. Neutron flux distributions are not uniform through the core, but rather vary approximately as a cosine function longitudinally through it and as a Bessel function across it. With uniform concentrations of fissionable material in the fuel, power levels and fuel temperatures are therefore higher in the center of the core than near its various peripheral surfaces. Even transversely across a given fuel assembly, particularly in reactor cores cooled by a neutron moderating liquid, the fuel elements at the periphery of the assembly will run substantially hotter than those in the center of the assembly. This is due to the higher population of thermal neutrons which builds up in the "slab" or layer of neutron moderating coolant which fills the space between immediately adjacent fuel assemblies outside of the tubular flow channels. Depending on the properties of the fuel and the moderator, the power level and central temperatures in such peripheral fuel elements may be as much as 300 to 400% higher than the average power level.

The flux and power peaking problems have not to date been successfully overcome in the present liquid moderated and cooled heterogeneous fuel power reactors. Nuclear fuel assemblies must be replaceable in the reactor and clearances between the assemblies are needed to permit their removal and insertion. Control poison elements must move freely in the core and again clearances are required to permit such movement. The slabs of liquid neutron moderating coolant which exist within these clearances give rise to the problems outlined above. In the past, elaborate attempts have been made to compensate for these problems, but to date no one has succeeded in developing a mechanical design of a reactor core in which the heterogeneous fuel elements and control poison elements could be disposed in a reactor without liquid moderator slabs.

For example, in one case the interassembly water slabs are partially displaced by strips of metal having a low neutron capture cross section and the control poison elements operating between the assemblies are provided with followers of such metal to minimize the size of the slab. However, this does not overcome the problem since the required clearances between the fuel assemblies and the control elements provide space for a slab in which flux peaking occurs, and there is a substantial increase in the amount of extraneous material in the core.

Another example of a prior effort to solve the problem involves the substitution of some central fuel elements in each fuel assembly with an open passage into which the liquid moderator-coolant is admitted. This induces a deliberate flux peak within the fuel assembly similar to the one existing in the surrounding slab and effectively raises the average flux level in the fuel elements between these bodies of liquid moderator. However a number of serious disadvantages result. Coolant by-passing through the central passage results unless a tubular flow channel is added here to prevent such by-passing. Such a channel increases the amount of extraneous structural material in the core. Reactivity is lowered due to neutron absorption in the liquid in the central passage. Although a lower fuel inventory may be possible, a decreased fuel heat transfer area results. In order to maintain the same moderator-to-fuel ratio in such an assembly, the fuel element spacing must be decreased making the lattice tighter and this in turn substantially increases mechanical complexity in respect to the fuel element spacers and supports and decreases the cross sectional area open to flow of coolant-moderator in contact with the fuel.

The present invention successfully overcomes the aforementioned problems for the first time and provides an improved liquid cooled and moderated nuclear fission reactor core which is free of the flux and power peaking, mechanical complexity, and other problems referred to above, and in which power and power densities increases of the order of about 100% have been found possible.

It is therefore an object of this invention to provide a nuclear power reactor having very substantially increased power output and power density capabilities.

It is another object of this invention to provide a liquid moderated and cooled nuclear reactor in which the local neutron flux and power peaking has been substantially eliminated without resort to complex or inefficiently used core structure.

Another object of this invention is to provide a liquid moderated and cooled reactor core in which the entire liquid cross section of the core is open to reactor coolant flow.

It is another object of this invention to provide a nuclear reactor core having a substantially reduced fraction of its total cross sectional area devoted to control poison elements for any given value of $\Delta k$.

An added object of this invention is to provide a simplified reactor core structure.

Other objects and advantages of the present invention will become apparent to those skilled in the art as the description and illustration thereof proceed.

Briefly, the present invention comprises an improved nuclear fission chain reacting assembly including a cellular reactor core structure providing elongated parallel neutron moderating coolant flow passages, each extending from an inlet opening at one end of the structure to an outlet opening at the other end of the structure, said flow passages being of substantially identical geometric cross section and each being separated from the immediately adjacent passages by a single wall of structural material, a nuclear fuel element assembly supported in each of at least a sufficient number of said passages to maintain a self-sustaining nuclear fission chain reaction in said structure in the presence of a neutron moderating coolant liquid, each said fuel assembly being provided with a plurality of nuclear fuel elements spaced apart from one another in said assembly by a distance sufficient to provide, with the moderating coolant in the intervening space therebetween and in the absence of vaporized moderating coolant, a given moderator-to-fuel atom ratio, the fuel element assemblies being proportioned with respect to the flow passage so that the peripheral fuel elements in each assembly are spaced apart from the proximate peripheral fuel elements in the adjacent fuel assembly by a distance through said single wall sufficient to provide, with the moderating coolant in the intervening spaces therebetween on each side of said wall and in the absence of vaporized moderating coolant, a moderator-to-fuel atom ratio which is substantially the same as that within each of the said fuel element assemblies.

Another aspect of this invention involves the provision, in the improved nuclear chain reacting assembly referred to immediately above, of at least one movable control poison element whose geometric cross section is substantially the same as that of at least one fuel element in said assembly, and preferably the provision of control poison elements whose geometric cross section is substantially the same as that of an outline formed by a closed line drawn around a plurality of adjacent fuel elements tangent to their exterior surfaces. Such control poison elements are provided with void or fuel followers secured to and axially aligned with said control poison element and having substantially the same geometric cross section as that of said follower. The control poison follower structures are reciprocably disposed in the chain reacting assembly to control neutron flux and power levels.

The present invention will be more readily understood by reference to the accompanying drawings in which:

FIGURE 1 is an elevation view and partial cross section of a nuclear reactor vessel and core cooled and moderated by boiling water with a bottom mounted control element drive system and including a schematic flow diagram of a dual cycle power electrical generation system;

FIGURE 2 is a transverse cross section view of the reactor vessel and the core taken at the elevation shown in FIGURE 1;

FIGURE 3 is a transverse cross section view of the reactor vessel and the core taken at the elevation shown in FIGURE 1;

FIGURE 4 is a transverse cross section view of part of a nuclear reactor core showing the details of one embodiment of this invention having a "checkerboard" arrangement of flow channels with fuel assemblies disposed within and between such channels, and having a control poison element whose geometric cross section is substantially the same as that of an outline formed by a closed line drawn around a plurality of fuel elements tangent to their exterior surfaces;

FIGURES 5a and 5b are transverse cross section views illustrating schematically two means for providing lateral support for the flow channels in two embodiments of this invention;

FIGURE 6 is a semi-schematic transverse cross section view of a reactor core structure having another embodiment of this invention;

FIGURE 7 is a semi-schematic transverse cross section view of a reactor core structure having still another embodiment of this invention;

FIGURE 8 is an enlarged isometric view of a portion of a reactor core support structure or grid suitable for use in supporting reactor cores embodying the present invention;

FIGURE 9 is a longitudinal view in partial cross section of a flow channel adapted to be inserted into and secured in the support structure shown in FIGURE 8;

FIGURES 10 and 11 are transverse cross section views of the flow channel of FIGURE 9 taken at the elevations shown;

FIGURE 12 is another longitudinal view of the structure shown in FIGURE 9 and taken at right angles to that view;

FIGURE 13 is a longitudinal view of a fuel element assembly adapted to be inserted into a flow channel such as is shown in FIGURE 12, and also adapted to be locked into the channel by means of a lock at its upper end;

FIGURE 14 is an elevation view showing some fuel assemblies inserted into the flow channels spaced apart from one another in the reactor core of this invention, the manner in which the fuel assembly locks the channel into the core support structure, and the manner in which the fuel assemblies are locked into the coolant flow passages provided within as well as between adjacent spaced apart pairs of flow channels;

FIGURE 15 is an enlarged detailed plan view of part of a reactor core having "checkerboard" arrangement of flow channels and showing fuel element assemblies locked into and between said flow channels together with a modified form of control poison element according to this invention;

FIGURE 16 is an elevation view in partial cross section showing a longitudinal view of the control poison element and fuel assembly follower taken in the direction shown in FIGURE 15 and illustrating the connection thereof to a top mounted control element drive system;

FIGURE 17 is a partial longitudinal view of a control poison element, such as shown in FIGURE 16, modified to substitute a void follower whose geometric cross section is the same as those of the control poison elements and the fuel assemblies in the core;

FIGURES 18 and 19 are transverse cross section views of two modifications of the void follower referred to in FIGURE 17 and in which, respectively, a gas space and a solid bar of material having a low neutron capture cross section provide the void;

FIGURE 20 is a longitudinal view of part of a fuel element assembly as shown in FIGURE 13 and provided with fuel element spacers; and FIGURE 21 is a transverse cross section view of the fuel element assembly shown in FIGURE 20 showing the arrangement of wire spacers and fuel elements in the assembly.

Referring now more particularly to FIGURE 1, the description of this figure is conducted in terms of a specific example of a nuclear reactor power plant system in which one embodiment of the present invention is used. The system includes reactor pressure vessel 10 provided with removable head 12 secured by means of flanges 14 and 16. This vessel is 39.5 feet inside height, 12.2 feet inside diameter, and has a wall thickness of 5.6 inches. Disposed within vessel 10 is a nuclear chain reacting assembly or core 18 made up of a plurality of nuclear fuel element containing flow channels 20 containing nuclear fuel element assemblies and upwardly through which a neutron moderating coolant liquid flows. Reactor core 18 is immediately surrounded by a shroud 22 and a thermal shield 24. The shroud 22, thermal shield 24, and the reactor core 18 are all supported upon a lower core support structure or grid 26 which in turn is suported by means of support elements 28 from the internal surfaces of vessel 10. Upper support means 30 are provided which secure the upper portion of the thermal shield structure within the vessel, and adjustable angle or bracket means 31 is provided to give lateral support to the upper periphery of shroud 22 and core 18. The nuclear reactor core structure consists of about 365 flow channels 20 supported from and secured to support grid 26. These flow channels are tubular, open ended, zirconium tubes of square cross section about 3.54 inches between the exterior surfaces of opposite walls, about 0.060 inch in wall thickness, having rounded corners with a centerline radius of 0.375 inch, and are about 10 feet long. The flow channels are disposed in core 18 spaced apart from one another in a "checkerboard" fashion, that is, corner to corner, forming within shroud 22 a cellular core structure having a total of about 730 coolant flow passages of square geometric cross section, half of which are provided within the 365 flow channels, the remaining 365 of which are provided between the adjacent flow channels in the "checkerboard" array. A nuclear fuel element assembly is secured in each of 636 of the flow passages. Each fuel assembly consists of 36 cylindrical fuel elements or rods arranged in a 6 by 6 array. The fuel elements are unsegmented, are about 9.5 feet long, are spaced apart from one another at intervals throughout their length by wire mesh spacer grids described below, and contain a substantially continous and uninterrupted body of sintered $UO_2$ of near 100% theoretical density as the nuclear fuel material. The $UO_2$ includes 1.5% $U^{235}O_2$. The area open to moderating coolant flow through the spacer grids is substantially equal to the geometric cross sectional area open to flow between the fuel elements. These fuel elements are 0.375 inch in outside diameter, including a 0.025 inch thick stainless steel clad, and are spaced on 0.580 inch centers to provide a volumetric moderator-to-fuel ratio of about 2 in the absence of vaporized moderator-coolant. The remaining 94 flow passages each receive a hollow water-filled control poison element of square cross section 3.275 inches wide, with about 0.25 inch radii at the corners, having walls about 0.375 inch thick, and fabricated of 2% natural boron in Type 347 stainless steel. The total reactivity worth of these control elements is over 20% $\Delta k$ and they occupy less than 13% of the core volume. These control elements are distributed throughout the reactor core and are reciprocated by means of 94 control element drive devices. Because of the checkerboard arrangement of the 365 flow channels, there is but a single channel wall existing between adjacent fuel assemblies, the local effective moderator-to-fuel ratio is uniform across the core, and there is no stagnant slab of neutron moderating coolant in which local flux peaks can occur. The local flux and power peaks in this core are substantially reduced so that all fuel elements in a given fuel assembly can be operated at power levels which are substantially identical. Only about 13% of the core volume is taken up with space reqired for control poison compared with 30–35% required for cruciform control elements operating between flow channels. The resultant power density in kilowatts per liter of core volume is about 100% above that of the usual reactor core having segmented fuel elements, fuel assemblies each having an integral flow channel, and interassembly control elements.

Demineralized light water constitutes the reactor coolant and the neutron moderator employed in this nuclear reactor. It is introduced into the bottom of vessel 10 by means of inlets 32 and 34 at or below the saturation temperature which is about 545° F. at an operating pressure of 1000 p.s.i.a. The water flows upwardly through lower support structure 26 and through all of the 730 flow passages in the core, in direct heat exchange relationship with the fuel element assemblies contained in the core. The water is heated to the boiling point and partially vaporized. A mixture of boiling water and steam is discharged into the region above core 18 and is deflected by means of turning vanes 36 toward reactor vessel outlets 38 and 40. This mixture is passed at a rate of about 47.5 million lbs. per hour by means of lines 42 and 44 into separator drum 46. Here the boiling water is separated from the steam, the steam being introduced through line 48 at a rate of about 3.0 million pounds per hour controlled by valve 50 into the high pressure inlet of dual admission steam turbine 52. The unvaporized water separated in steam drum 46 is pumped by means of pump 54 through lines 56 and 58 at a rate controlled by valve 60 into secondary steam generator 62. This water, at its boiling temperature of about 545° F., is passed through heat exchange coil 64 where it is cooled. Additional steam is produced on the outside of coil 64 at pressures ranging between about 500 and 1000 p.s.i.a. depending upon system load. This additional or secondary steam is introduced by means of line 66 at a rate controlled by valve 68 into the secondary steam admission port of turbine 52. The turbine drives an electrical generator 70 which is connected through the usual transformer to a transmission line, or to any other load, by means of output terminals 72. Exhaust steam from turbine 52 is condensed in condenser 74 from which it is removed through line 76 by means of condensate pump 78. The condensate is passed through line 80 at a rate controlled by valve 82 and becomes feedwater in the power plant system.

One portion of the condensate becomes the secondary feedwater, it is passed through line 84 at a rate controlled by valve 86 into the secondary steam generator 62 for re-evaporation. The remaining condensate is combined with the subcooled water discharged from the secondary steam generator coil 64 through line 88, the mixture being introduced directly through line 90 to primary cooling water inlets 32 and 34.

The thermal energy release level of core 18 is controlled by means of the 94 control poison elements 92 which are reciprocable by means of an equal number of control rod drive mechanisms 94. The control elements 92 are withdrawn from the core to increase reactivity and raise the power level, and are inserted into the core to decrease reactivity and to lower the power level of the core. Only one control rod 92 and control rod drive mechanism 94 are shown in FIGURE 1 for simplicity of illustration. Also, although the control rod drives are shown mounted below the pressure vessel 10 and extend upwardly into the core, top mounted drives on vessel head 12 extending downwardly into the core may be substituted.

By virtue of the inclusion of the present invention in the nuclear power reactor core described above with its full core length unsegmented fuel elements of smaller diameter, its absence of slabs of neutron moderating coolant, its liquid cross sectional area entirely open to flow, and its minimal volume devoted to control poison elements, the maximum power density at which the core can be operated without central melting in any fuel element has been increased from about 28 kilowatts per liter to about 57 kilowatts per liter due to the absence of local power peaking. The thermal power rating of the core is about 1300 megawatts and the gross electrical output of the plant is about 350 megawatts.

In FIGURE 2 is a transverse cross section view of reactor vessel 10 taken through the core support at the level shown in FIGURE 1. Reactor vessel 10 is shown surrounding lower core support structure 26 and thermal shield 24. The cellular nature of the core support structure 26 appears. It is an egg-crate type of structure consisting of support bars 100 and 102 intersecting at right angles to provide a plurality of approximately square openings 104. Additional details of such a core support structure are shown in other drawings subsequently described.

In FIGURE 3 is another transverse cross section view of the reactor vessel 10 taken through the core at the elevation shown in FIGURE 1. Again reactor vessel 10 and thermal shield 24 are shown. The approximately circular transverse cross section of the core 18 is shown made up of a plurality of square flow channels 20 arranged corner to corner on a square pitch in checkerboard fashion leaving between such channels open coolant flow passages 106 through which neutron moderating coolant may also flow. In order to close the fourth side 108 and the third and fourth sides 110 and 112 of peripheral flow passages 114 and 116 respectively, which are otherwise open, and to provide for the lateral support of the core structure, a shroud 22 is provided surrounding the core structure and extending from the top to the bottom hereof. Shoud 22 is provided on its inner surface with filler strips 23 and 25 adjacent the open coolant flow passages 114 and 116. These strips are of a thickness about equal to that of the channel walls and serve to maintain in these peripheral passages the same geometric cross sectional area open to fluid flow as exists within the flow channels and provide the same moderator-to-fuel ratio as exists in the adjacent fuel assemblies in the core. Shroud 22 is supported laterally at its upper end by means 31 shown in FIGURE 1.

In FIGURE 4 is shown an enlarged detailed plan view of one portion of one form of reactor core structure embodying this invention as described in connection with FIGURE 1 above. Shroud 22 surrounds the group of square flow channels 20 arranged in checkerboard fashion leaving therebetween open coolant flow passages 106 as previously described. In each of the flow passages enclosed by channels 20 and in the flow passages 106 between the channels is disposed an assembly of nuclear fuel elements 120, here shown as cylindrical in form and arranged in a 5 by 5 square array in all flow passages other than those provided with control poison element 122. The cruciform geometric cross section of control poison element 122 is substantially the same as that of the outline formed by a closed line drawn around the intersecting pair of center rows of fuel elements 124 tangent to their exterior surfaces, i.e. the adjacent plurality of the elements which would otherwise occupy the space in the core structure in which the control poison element 122 is reciprocable. If desired, fuel elements 124 may be secured to and be reciprocable with control poison element 122 as a fuel follower. It should be noted that the fuel elements in such a follower are equal in number to and axially aligned with the plurality of adjacent fuel elements otherwise occupying the space in which the control poison element is reciprocable.

The nuclear fuel assemblies disposed in each of the coolant flow passages contain fuel elements 120 having a radius $r$. The elements are spaced apart from one another at a center to center distance $d_1$. Surrounding any given such fuel element is a body of flowing coolant moderator within region 126 whose geometric cross sectional area is equal to $d_1^2 - \pi r^2$. The relative values of $d_1$ and $r$ determine and are selected to provide the moderator-to-fuel ratio desired in this reactor core, the volumetric ratio $R_1$ being substantially equal to $$\frac{d_1^2 - \pi r^2}{\pi r^2}$$

Allowance may be made for the volume of the fuel element clad if desired. This ratio has a strong effect on the reactivity of the core and its temperature and void coefficients. The ratio is therefore selected to provide the desired values of these characteristics. The lateral dimensions $d_2$ of the flow channel are substantially equal to $nd_1 + t$, where $n$ is the number of fuel elements along the width of the assembly and $t$ is the channel wall thickness. The relative disposition of the flow channels 20 in the core is such that the lateral dimensions $d_3$ of the open flow passages 106 formed between the channels are substantially equal to $d_2$. The channel corners are rounded to prevent interference with one another. In this way the center to center distance $d_4$ between a peripheral fuel element 120a within a flow channel 20 and a proximate fuel element 120b in an open flow passage 106 is substantially equal to $d_1 + t$. Thus the body of flowing coolant moderator surrounding each of these peripheral fuel elements in regions 128 and 130 respectively have geometric cross sections equal to $d_4^2 - \pi r^2$ and provide a volumetric moderator-to-fuel ratio $R_2$ substantially equal to $$\frac{(d_4-t)^2 - \pi r^2}{\pi r^2}$$

and which provides the same, or substantially the same, moderator-to-fuel ratio as that provided by the moderator in region 126 surrounding a fuel element 120 located other than on the periphery of a fuel assembly.

It has been found in the practice of this invention that the observation of these requirements, exemplified immediately above in a core having square flow passages, permits the construction of a nuclear reactor core having substantially no local inhomogeneities in moderator-to-fuel ratio. Unlike conventional reactor cores in which part of the effective moderator exists between adjacent flow channels as stagnant (relatively non-flowing) slabs, in reactor core structures embodying this invention all of the moderator exists within the flow passages in an active flowing region. The geometric cross section of the liquid portion of the core is equal to the geometric cross section of the core open to liquid moderator-coolant flow. The relative values of $d_1$ and $d_4$ on one hand and of $r$ on the other hand determine the moderator-to-fuel ratio in the core, a ratio which in the practice of this invention can be uniform entirely throughout the structure at given values of moderator-coolant temperature and degree of vaporization, if any.

Referring now briefly to FIGURES 5a and 5b, means for supporting channels 20 in the corner to corner or checkerboard arrangement previously described are schematically shown. In the arrangement in FIGURE 5a one-half of the flow channels 20a are provided along each of their corners with a pair of angular projections 132 forming an outwardly opening angle or bracket which can engage the corner 134 of the immediately adjacent channel 20b. These angles also inhibit fluid flow between adjacent flow passages 106. Another relatively simple mechanical support means which may be substituted is shown in FIGURE 5b and it involves the formation of a flat bearing surface 131 along the corner of each flow channel 20c at 45° to the channel sides. These surfaces on a given channel contact corner bearing surfaces of the adjacent four channels so that they support one another within the shroud.

In FIGURE 6 is shown a plan view of a modified form of the cellular reactor core structure embodying the present invention. Again, the thermal shield 24 is shown surrounding an outer shroud 30. A plurality of open flow passages 106 of square geometric cross section are formed between a plurality of structural plate elements or sheets 140. These plate elements are broken at 90° angles and in opposite directions along successive parallel spaced lines 142, 144, 146, etc. along their surfaces to give the plate a zig-zag cross section. These broken sheets are disposed vertically and side by side throughout the region enclosed by shroud 30 as shown with their lower edges resting on the core support structure and with the corners of adjacent plate elements adjoining forming therebetween a plurality of open flow passages 106 of square cross section. Plate elements 140 may be secured to one another at the contacting corners such as by welding. The plate elements may be secured at their lateral edges to the inside surface of shroud 30 by means not shown to provide lateral support and to close the otherwise open peripheral flow passages in the core structure. The use of angles of the type shown in FIGURE 5 may be used to secure these edges to the inside surfaces of shroud 30.

In FIGURE 7 a plan view of a third modification of the cellular reactor core structure embodying this invention is shown in which the open flow channels 150 of hexagonal geometric cross section are provided. Thermal shield 24 encloses shroud 152 which extends from top to bottom and completely around the core structure. Arranged side by side within shroud 152 is a plurality of broken plate elements or sheets 154, their lower edges resting on the core support structure and secured at their lateral edges 156 and 158 to the interior surfaces of the shroud 152. These plate elements are broken at 30° angles and in opposite directions along successive parallel spaced lines 160, 162, 164, 166, etc. along their surfaces to give the plate a zig-zag cross section. At alternate breaks 162, 166, etc. for example, strips 170 are provided and are integrally secured by conventional means perpendicularly to and between the alternate most adjacent breaks in each pair of immediately adjacent plate elements. These broken plate elements are disposed vertically, parallel to and spaced apart from one another in the cellular core structure and, together with the surrounding shroud and the strips 170, provide the plurality of open flow passages 150 of hexagonal cross section.

Referring now to FIGURE 8, detailed isometric partial view of one form of a core support structure or grid is shown. This consists of a plurality of parallel beams 180 provided with openings 182. These beams are spaced apart from one another on edge and supported at their ends by any convenient means, such as by welding or other connection, to a peripheral ring. Intersecting beams 180 at right angles is another plurality of parallel beams 184 to which they are rigidly secured forming an integral grid support structure having a plurality of rectangular cells 186. If desired, for added rigidity, the number of beams 184 may be increased to divide the grid support structure into smaller square cells. The intersection of these grid beams 180 and 184 is probably most easily achieved by slotting one or both of the beams so that they fit together as an egg-crate in the manner shown. The mated sections may then be connected together in any convenient manner at each intersection. Openings 182 are provided in order to receive a flow channel latching member hereinafter described which is contained in the flow channel. The openings provide a downwardly facing surface 188 which is contacted by the latching member thus serving to resist the forces generated by the upwardly flowing coolant, and other forces. Broken lines 190 indicate the positions of the flow channels arranged in the coroner to corner or checkboard fashion described above and illustrated in FIGURES 3 and 4.

Obviously, other mechanical arrangements of the core support structure shown in FIGURE 8 may be made. For example, openings 182 may be supplemented by additional openings not shown but which can be similarly placed in the intersecting set of beams 184. The beams 184 may be made as deep as beams 180. Also, by using a flow channel latch arrangement which extends further downwardly through the core support structure, the downwardly facing surface 192 at the bottom of either or both of the beams 182 or 184 may be used to engage the latch instead of the special openings 182. Other mechanical modifications will occur to those skilled in the art.

Referring now to FIGURE 9, a longitudinal view in partial cross section is shown of a flow channel with its nose or support piece. This structure consists, in this modification, of a tubular flow channel element 200 of square cross section which is provided at its upper end with openings 202 serving to receive a fuel assembly latch member to secure a fuel assembly either on the inside of the channel, or in a coolant flow passage immediately outside the channel. Spacer strips 204 are provided at the outside corners of the flow channel in order to maintain the appropriate spacing of the flow channels 200 from one another in the checkerboard arrangement described. At the lower end of channel 200 is provided nose or support element 206 which is secured at the lower end of channel 200 by attachment means 208. Nose piece 206 consists of an upper tubular section 210 which is substantially the same geometric cross section as the flow channel 200 and from the two opposite sides of which pieces have been cut leaving extensions 212 bent inwardly and tapered at their lower ends, on the other two opposite sides of the support piece. This provides a bearing surface 214 which rests directly against the upper surface of the core support grid structure, extensions 212 extending downwardly into the support grid cells. Extending across the support piece between extensions 212 are stiffening members 216 to give rigidity to the nose piece extensions. A channel latch element or tongue 218, provided with a latching head 220 at its lower end, is provided by cutting a U-shaped opening 222 in opposite sides of support piece 208 including extensions 212.

In FIGURE 10 is a transverse cross section view of the upper end of the flow channel taken at the elevation shown in FIGURE 9. The cross section of flow channel 200, with its lateral fuel latch openings 202 and corner spacer pieces 204, is clearly shown.

In FIGURE 11 is a transverse cross section view of the flow channel taken at the elevation shown in FIGURE 9 through the support element 206. Here lower section 210, stiffening members 216, opening 222, and the channel latch elements 218 and heads 220 are shown.

In FIGURE 12 a longitudinal view of the flow channel 200 in partial cross section is shown taken at right angles to the view in FIGURE 9. Elements shown here and in FIGURES 9 through 11 are designated by the same numbers. Extension 212 with a stiffening member 216 extending therebetween are shown. Channel latch elements 218 are shown as flexible tongues, actually being portions of the walls of upper section 210 and extension 212 which are produced by the formation of a U-shaped opening 222 in the structure. The channel latch elements 218 are provided at their lower end with a latching head 220, in this modification a small length of round bar stock slotted and welded to the end of the flexible tongue 218. They serve to removably secure the flow channels individually into the core support structure.

In FIGURE 13 is shown a foreshortened longitudinal view of a fuel assembly adapted for use in the present invention. This fuel assembly consists of a plurality of elongated fuel elements 226 disposed parallel to one another to form a fuel assembly 228. The elements are here shown as rods, although other shapes such as tubes, plates, other geometric cross sections could be substituted. Fuel elements 226 are secured between upper and lower support means 230 and 232 which provide an open coolant flow area which is not substantially less than the open area between fuel elements 226. Extending downwardly from lower support means 232 is a channel latch locking element 234. Extending upwardly from upper support means 230 is extension 236 provided with a rotatable handle 238 having a pair of lugs 240 (shown more clearly in FIGURE 14) and loading spring 242. Loading spring 242 tends to bias handle 238 in the position shown with the axis of lugs 240 parallel to one of the transverse dimensions of the fuel assembly, but rotation of the handle 238 through a maximum of about 90° between positive stops is permitted against the bias force of the spring 242.

The fuel assembly shown in FIGURE 13 is adapted to be inserted downwardly directly into the flow channel structure shown in FIGURE 12. Support means 230 and 232 slide against the interior surfaces of channel 200. The distance between the outer surfaces of lugs 240 is greater than the width of the channel 200. The fuel assembly can however be inserted fully into the channel provided handle 238 is turned approximately 45° from its normal position with respect to the fuel assembly against the torsion force of loading spring 242 so as to lie approximately along the diagonal of the square channel. When completely inserted into the channel, channel latch locking element 234 extends downwardly between and locks channel latching elements 218 into engagement with the locking surface provided in the core support grid structure as previously described. The handle 238 is then allowed to turn back about 45° by means of spring 242 to its normal position parallel to a transverse dimension of the fuel assembly, in which position fuel locking lugs 240 slide into openings 202 at the upper end of channels 200. This locks the fuel assembly securely into the channel and the channel into the core support grid. The fuel assemblies can similarly be secured in the flow passages provided between the adjacent flow channels in the checkerboard core of this invention, they are however turned 90° with respect to the fuel assemblies within the channels 200 to permit latching of lugs 240 in the unused openings 202 of adjacent channels as shown more clearly in FIGURE 14.

In FIGURE 14 is shown a foreshortened longitudinal view in partial cross section of a plurality of channels 200 and fuel assemblies 228 locked into the various positions in the cellular reactor core structure of this invention as above described. Individual structural elements previously described in connection with FIGURES 9 through 13 are here indicated by the same reference numerals. The outer two channels are shown locked removably and individually into core support grid 26 by channel latches 220 and by latch locking element 234 on each fuel assembly 228. The fuel assemblies in turn are secured in the channels by engagement of lugs 240 in two of the four openings 202 provided at the upper end of channels 200. The fuel assembly 228a located in the flow passage formed between the spaced channels 200 is turned 90° with respect to assemblies 228 and is secured thereby means of lugs 240a of handle 238a in two of the remaining openings 202. If desired, the fuel assemblies 228a and 228 may be sized so that their lower support means 232 rest on core support grid 26, although this is ordinarily not necessary. Thus, of the four latching openings 202 provided in the four surfaces at the upper end of each flow channel, two of these are occupied by the latching lugs 240 connected to the fuel assembly within that channel, the other two being occupied by one latching lug 240a of each fuel assembly in the adjacent coolant flow passages in which no flow channel is inserted, and all of the fuel assemblies are thus latched removably and individually into the flow passages provided within and between the flow channels.

This relative orientation of the fuel assemblies in the flow passages is more clearly shown in FIGURE 15 which is a plan view of part of a reactor core embodying this invention and taken at the level indicated in FIGURE 14. Square flow channels 200 are arranged in the corner to corner or checkerboard array as previously described. Corner extensions or spacer pieces 204 provide bearing and wear surfaces. Fuel assemblies are inserted into each flow channel 200 with their handles 238a oriented parallel to each other as shown. Latching lugs 240a extend and are latched into two of the openings 202a. Fuel assemblies are also inserted in the coolant flow passages 250 of square cross section which exist between the spaced flow channels 200. The fuel assemblies are oriented so that their handles 238 are normally at right angles to those within the channels and so that their locking lugs 240 extend and are latched into the other channel openings 202 from the outside.

In FIGURE 15 is also shown a pair of control poison elements 252 having relatively heavy walls and provided with a central opening 254. The central opening is open for flow of liquid moderating coolant and the wall may contain a nuclear fission reaction poison such as boron, mercury, silver, cadmium, gadolinium, dysprosium, hafnium, europium, or any other of the well known control poisons. Control elements 252 are reciprocable in an otherwise open passage formed in the core structure between flow channels 200 in which fuel assemblies are inserted.

The transverse dimension $d_5$ of the central opening 254 is preferably about equal to the slowing down length, that is, the net vector or crow flight distance a neutron moves from its formation as a fission neutron through a given moderator in attainment of thermal energy, and preferably between about 0.25 and about 5 times the slowing down length. In this way maximum control effectiveness per unit of core geometric cross sectional area taken up by control poison elements is obtained. Fast or epithermal neutrons entering one side of the control element are thermalized in the moderator body within the control element and then are strongly absorbed by the control poison encountered after passing through the moderator body. A substantial reduction in the core volume occupied by control poison elements for a given degree of control is obtained.

In FIGURE 16 is a foreshortened longitudinal view in partial cross section of a control poison element 252 and its fuel assembly follower 228a taken in the direction shown in FIGURE 15. The control poison element is connected at its upper end to a top mounted control rod drive mechanism by means of rod 258. This is secured into a yoke 260 at each end of which is provided a latching mechanism 262 for connection to the upper end of control element 252. In this modification the latching element consists of a handle 264 connected to an actuating rod 266 extending through housing 268. Cam 270 is rotated by means of rod 266 to displace each locking ball 272 outwardly through an opening 274 in housing 268 and into an engagement with a detent 276 on the inner surface of the upper end of control element 252. In this way several control poison elements may be reciprocated simultaneously by means of a single drive mechanism mounted above the reactor vessel. Other suitable means for connecting the control rod drive element to the rod drive and for driving the control poison elements individually may be substituted if desired.

In FIGURE 17 is shown a foreshortened longitudinal view of the follower end of a modified form of the control poison-follower structure described above in connection with FIGURE 16. Void follower element 269 is secured axially by connecting means 267 to the lower end of control poison element 252. The follower element has the same geometric cross section, i.e. square with rounded corners, as the control poison element to which it is attached as illustrated in FIGURES 15 and 16. The void follower prevents admission of moderator into the core region from which the control poison element is withdrawn. This in turn prevents the formation of excessive moderator slabs at the edges of adjacent fuel assemblies, the variation in effective moderator-to-fuel ratio at the peripheral fuel elements in such assemblies, and the resultant flux and power peaking which would otherwise occur.

In FIGURES 18 and 19 are shown the transverse cross section views of two modifications of void follower which can be connected to the control poison element of FIGURES 16 and 17 and used in the present invention. In FIGURE 18 a hollow follower 269, having substantially the same geometric cross section as the control poison element to which it is attached, is internally supported against forces resulting from the operating pressure of the ambient liquid moderator-coolant by means of a bundle of tubes 271 closely fitted into the follower. In FIGURE 19 such a follower 269 is filled with a solid bar 273. In either case, the follower is fabricated from a corrosion resistant material, such as stainless steel or Zircaloy, or other material suitable in the particular coolant present. Tubes 271 and bar 273 are preferably formed of a strong light weight material having a low neutron absorption cross section and substantially no epithermal neutron moderating properties. Materials such as aluminum or the like are suitable. Analogously, void followers can be secured to and moved with control poison elements having other than square geometric cross sections.

In FIGURES 20 and 21 are shown an enlarged portion of the fuel assembly previously discussed in connection with FIGURES 13 and 14. Fuel assembly 228 is provided with a plurality of straight-through or unsegmented fuel rods or elements 226 which contain a continuous and uninterrupted body of nuclear fuel material. Also illustrated here is a fuel element spacer structure 280 suitable for fixing fuel elements 226 at pre-determined distances from one another at intermediate points along their length without substantially reducing the moderator-coolant flow area. This structure 280 is a wire mesh structure which extends into sliding contact with the adjacent surfaces of the flow channel or channels 200 such as at the inside corners thereof. The structure 280 is formed from a first pair of transverse parallel wire elements 284 extended in one direction along the opposite sides of each row of fuel rods 226. A second pair of transverse parallel wire elements 286 are extended along the opposite sides of each row of fuel rods at a 90° angle to elements 284. These criss-crossed wire elements 284 and 286 are welded together at each wire intersection for strength and dimensional control. They are spaced with respect to the fuel element diameter to provide a slight interference fit between fuel rod and wire. Thus no other attachment to the fuel is needed after location of the spacer structures 280 at the desired points along the length of the fuel element assemblies 228. Alternatively, structures 280 may be secured to the outer surfaces of some or all fuel rods 226 such as by brazing, or welding, if desired.

EXAMPLE I

In the description of FIGURE 1 is given a specific example of a large dual cycle nuclear power reactor cooled and moderated by boiling water and in which the steam driving the turbine generator load is supplied in part directly from the reactor pressure vessel and in part from at least one secondary steam generator heated indirectly by a stream of unvaporized water recirculating from the pressure vessel and through the secondary steam generator.

EXAMPLE II

The Vallecitos Boiling Water Reactor is modified to embody the present invention and following are given the significant data concerning the reactor plant. The reactor vessel is 7.0 feet inside diameter, has a wall thickness of 3.375 inches including an inner clad of Type 304 stainless steel 0.375 inch thick, and has an outside height of 19.75 feet. The top head is flanged and bolted, and carries penetrations for 7 top mounted control poison element drives.

The core support grid consists of 15 parallel beams about 45 inches long, 0.5 inch thick, 4.5 inches deep, and spaced apart from one another on 3.10 inch centers. Extending at right angles through these spaced bars are 30 parallel 0.5 inch diameter rods, arranged in 15 pairs spaced horizontally apart from one another on 3.10 inch centers, the rods in each pair being vertically spaced apart from one another on 3.0 inch centers. The bars and rods are secured together at their intersections by means of 0.125 inch diameter pins. All elements are fabricated of Type 304 stainless steel.

The core structure is square in geometric cross section, approximately 3.6 by 3.6 feet along its sides, and is approximately 70 inches high. The shroud thickness is 0.125 inch. The cellular core structure contains 196 individual cells in a 14 by 14 array formed from a checkerboard or corner to corner arrangement of 98 flow channels. These channels are approximately 70 inches long, 3.16 inches in outside width, and are 0.060 inch in wall thickness.

There are 14 control poison elements driven in pairs by the 7 control drives. The control poison elements are hollow, of square cross section 2.875 inches in outside width, about 33 inches long, have a wall thickness of 0.25 inch, and are fabricated of 2 percent natural boron stainless steel. The corners are bevelled at 45° and the poison elements are provided with openings at each end to permit colant moderator flow through the central opening. Each control poison element is provided with a fuel element assembly follower having essentially the same dimensions as the regular fuel assemblies described below.

The fuel assemblies are each a 5 by 5 square array of 25 cylindrical fuel elements approximately 33 inches long with 32 inches of active fuel length. The elements have a 0.020 inch thick stainless steel clad and are 0.375 inch in outside diameter. The fuel material is sintered high density $UO_2$ containing 1.50 percent by weight $U^{235}O_2$. The reactor core contains 126 such fuel assemblies placed in as many cells near the center of the cellular core structure in a 12 by 12 array with the 4 corners missing. There are 14 control elements in as many cells, and the remaining 56 cells around the core are plugged.

This core operates at 1000 p.s.i.a. and 545° F. and is cooled and moderated by boiling light water. It generates 50 megawatts of thermal energy delivering saturated steam directly to single admission turbine. The average power density is 78 kilowatts per liter.

EXAMPLE III

Following are significant data concerning a power reactor moderated and cooled by pressurized (non-boiling) light water and embodying the present invention. The reactor vessel is 12.0 feet outside diameter, has a wall thickness of 9 inches including an internal stainless steel clad, and is 35.7 feet in outside height. The top head is flanged and bolted and provided with penetrations through which top mounted control rod drive mechanisms actuate 24 control poison elements with fuel followers.

The reactor core is approximately circular in cross section, fitting within a circumscribed circle about 100 inches in diameter. The cellular core structure contains 97 hexagonal cells, each separated from one another by a single wall of 0.050 inch thick Type 304 stainless steel. Six additional half-cells of approximately trapezoidal cross section are spaced 60° apart from one another around the periphery of the core structure to complete the circular cross section. The hexagonal cells are 9.64 inches inside dimension measured between opposite corners. The core structure is surrounded by a shroud which is 0.250 inch thick and 114 inches high.

The hexagonal fuel assemblies each contain 217 cylindrical unsegmented fuel elements or rods arranged on 0.566 inch centers in a triangular pitch to form the hexagonal array. Each element is 0.440 inch outside diameter and has a 0.022 inch thick stainless steel clad tube filled with sintered $UO_2$ pellets 0.391 inch outside diameter. The fuel assembly measures about 8.4 inches between opposite sides and about 9.5 inches across the opposite corners. The $UO_2$ fuel material contains about 3.0 percent by weight $U^{235}O_2$. The volumetric moderator-to-fuel ratio is about 2.3.

The reactor core operates without central fuel melting at 690 thermal megawatts. It is cooled and moderated by light water flowing at a rate of 45 million pounds per hour, entering the core at about 580° F. and leaving at about 620° F. The system pressure is 2000 p.s.i.g. This coolant is circulated from the reactor vessel through steam generators which evaporate 2.8 million pounds of water at 1065 p.s.i.g. and 545° F. This steam drives a steam turbine-generator which delivers 236,000 kilowatts of net electrical output. The power density is about 50 kilowatts per liter of core volume.

EXAMPLE IV

The reactor cores embodying the present invention as illustrated in the foregoing examples can utilize heavy water, substantially pure $D_2O$, as the coolant-moderator. The principal modification in the fuel lattices is to increase the fuel element spacing substantially so that the volumetric moderator-to-fuel ratio is in the range of from about 10 to about 14.

EXAMPLE V

Following are the significant data concerning an organic liquid moderated and cooled power reactor embodying the present invention. The reactor vessel is 68 feet high and 13.5 feet outside diameter. It has a 2 inch thick wall and is designed to operate at a pressure of about 100 p.s.i.a. The top head is flanged and bolted. The control rod drive penetrations extend through the bottom head.

The reactor core is approximately circular in cross section, having an equivalent diameter of 132 inches. The active or fuel containing portion of the core is 144 inches in length. The cellular core structure contains 352 flow passages formed from a checkerboard array of 176 stainless steel flow channels each having a wall thickness of 0.035 inch, an outside width of 5.125 inhces, and a length of about 13.5 feet. The core structure is surrounded by a supporting shroud 0.25 inch thick and 13.5 feet high.

The fuel assemblies each contain 100 cylindrical unsegmented fuel elements 154 inches long arranged in a 10 by 10 square array on 0.505 inch centers. The elements are provided with an extruded sintered aluminum product (approximately 93% aluminum and 7% aluminum oxide) clad tube having 10 equally spaced longitudinal but helical fins. The maximum and root diameters of the clad tube are 0.502 and 0.303 inch respectively and the radial wall thickness of the tube is 0.015 inch. The fuel is sintered high density $UO_2$ containing 2.50 percent $U^{235}O_2$, the pellets being 0.300 inch outside diameter. The volumetric moderator-to-fuel ratio is about 2.9.

Fuel assemblies are placed in 376 of the flow passages. Of these, 336 are fixed in the core structure, while 40 are provided as fuel followers connected to the 40 reciprocable control poison elements. The control elements are hollow and of square cross section with a 4.87 inch outside width and a 0.625 inch thick wall. The control poison is boron stainless steel.

The reactor core operates without central fuel melting at a power level of 1520 thermal megawatts. It is cooled and moderated by an 82 million pound per hour flow of a high-boiling hydrocarbon liquid having approximately the following composition.

*Table 1*

| Component: | Volume percent |
|---|---|
| Ortho-terphenyl | 7 |
| Meta-terphenyl | 42 |
| Para-terphenyl | 21 |
| Higher boiling pyrolytic and radiolytic decomposition products or polymer | 30 |
| Total | 100 |

This liquid is pumped upwardly through the reactor core, entering at about 550° F. and leaving at about 670° F. The exit coolant is cooled indirectly in a stream generator system which produces 5.13 million pounds of superheated steam per hour at a temperature and pressure respectively of 650° F. and 600 p.s.i.g. The plant load is a 450 megawatt steam turbine generator system. The power density of the reactor core is approximately 55 kilowatts per liter. This may be compared with the customary power density of about 32 kilowatts per liter in conventional organically cooled and moderated reactors utilizing fuel assemblies surrounded by individual flow channels spaced apart from one another to provide clearances for the insertion of control poison blades or cruciforms between the channels or fuel assemblies.

Nuclear fuel suitable for use in reactor core structures embodying the present invention may include the fertile isotopes of uranium, plutonium, or thorium, and any others which are available, as well as the fissionable isotopes $U^{233}$, $U^{235}$, $Pu^{329}$, $Pu^{241}$, and any others which are available. The fertile and fissionable fuels may be employed in elemental form as the metals, or as mixtures of metals such as the alloys, or as chemical compounds such as the oxides, carbides, nitrides, silicides, and the like. The fertile materials may be admixed with the fissionable materials at various degrees of enrichment, or they may be separated from one another and located in individual fuel elements or assemblies, as in the known "spiked" and "blanketed" core designs.

In the control poison elements, various nuclear reaction poisons may be used such as boron, cadmium, gadolinium, silver, dysprosium, samarium, europium, hafnium, mercury, and other known elements having high non-fission neutron capture cross-sections. These nuclear poisons may be used in solid, semi-solid, or as liquids in molten or solution form. Further, they may be employed in elemental, mixture, or compound form.

As structural materials in the apparatus of this invention, such materials as stainless steel, aluminum and its alloys, zirconium and its alloys, and nickel and its alloys may be used.

A particular embodiment of this invention has been described in considerable detail by way of illustration. It should be understood that various other modifications and adaptations thereof may be made by those skilled in this particular art without departing from the spirit and scope of this invention as set forth in the following claims.

I claim:

1. An improved nuclear fission chain reacting assembly which comprises a plurality of shaped members formed of relatively thin-walled structural material having a low neutron absorption cross section and disposed on edge adjacent one another to form a cellular reactor core structure providing elongated, parallel, neutron moderating coolant flow passages, each extending from an inlet opening at one end of the structure to an outlet opening at the other end of the structure, said flow passages being of substantially identical geometric cross section and each being separated substantially throughout its entire periphery from the immediately adjacent passages only by a wall comprising a single thickness of said structural material, a nuclear fuel element assembly removably supported in each of at least a sufficient number of said passages to maintain a self-sustaining nuclear fission chain reaction in said structure in the presence of a neutron moderating coolant liquid, each said fuel assembly being provided with a plurality of linear elongated nuclear fuel elements spaced apart from and parallel to one another in said assembly by a distance sufficient to provide, with the moderating coolant in the intervening space therebetween, a given moderator-to-fuel atom ratio, the fuel element assemblies being proportioned with respect to the flow passage to space the peripheral fuel elements in each assembly apart from the proximate peripheral fuel elements in the adjacent fuel assembly by a distance through said wall sufficient to provide, with the moderating coolant in the intervening spaces therebetween on each side of said wall, a moderator-to-fuel atom ratio which is substantially the same as that within each of the said fuel element assemblies, at least one control poison element having a geometric cross section which is substantially the same as that of at least one fuel element in said assembly and positioned reciprocably within said chain reacting assembly in a space otherwise occupied by said fuel element, and a follower element secured to and axially aligned with said control element and having substantially the same geometric cross section as that of said control element.

2. A chain reacting assembly according to claim 1 wherein said control poison and follower elements have a geometric cross section which is substantially the same as that of an outline drawn around a plurality of adjacent fuel elements tangent to their exterior surfaces.

3. A chain reacting assembly according to claim 1 wherein said cellular reactor core structure comprises a plurality of parallel tubular open-ended flow channels of substantially square cross section disposed in a corner to corner or checkerboard array forming an additional plurality of flow passages of substantially the same geometric cross section between the adjacent flow channels in the array, and a shroud surrounding said plurality of flow channels to provide lateral support therefor and to close the otherwise open sides of the peripheral flow passages in said array.

4. A chain reacting assembly according to claim 1 wherein said cellular reactor core structure comprises a plurality of structural plate elements each broken at 90° angles and in opposite directions along successive parallel lines spaced along their surfaces to give the plate a zig-zag cross section, said plate elements being disposed side by side throughout said core structure and with the corners of adjacent plate elements adjoining to form therebetween said plurality of flow passages of square cross section, and a shroud surrounding said plurality of plate elements to provide lateral support for said elements and to close the otherwise open peripheral flow passages in said core structure.

5. A chain reacting assembly according to claim 1 wherein said cellular core structure comprises a plurality of structural plate elements broken at 30° angles and in opposite directions along successive parallel lines spaced along their surfaces to give each plate a zig-zag cross section, said plate elements being disposed parallel to and spaced apart from one another, a plurality of structural strip elements secured perpendicularly to and between the alternate most adjacent breaks in each pair of immediately adjacent plate elements to provide with said plate elements said plurality of open flow passages of hexagonal geometric cross section, and a shroud surrounding said plurality of plate and strip elements to provide lateral support for said elements and to close the otherwise open peripheral flow passages in said core structure.

6. An improved nuclear fission chain reacting assembly which comprises a relatively thin-walled, cellular reactor core structure providing elongated, parallel, neutron moderating coolant flow passages each extending from an inlet opening at one end of the structure to an outlet opening at the other end of the structure, said flow passages being of substantially identical square geometric cross section and each being separated substantially throughout its entire periphery from the immediately adjacent passages only by a wall comprising only a single thickness of said structural material having a thickness $t$ and a low neutron absorption cross section, said core structure being formed from a plurality of removable parallel tubular open-ended flow channels of substantially square cross section and of width $d_2$ disposed in a corner to corner or checkerboard array whereby part of said flow passages are provided in said flow channels and the remainder are provided with a width $d_3$ substantially equal to $d_2$ between said channels in said array, said core structure including a shroud surrounding said plurality of flow channels to provide lateral support for said channels and to close the otherwise open sides of the peripheral flow passages between peripheral flow channels in said core structure, a nuclear fuel assembly removably supported in each of at least a sufficient number of said passages to maintain a self-sustaining nuclear fission chain reaction in said structure in the presence of a neutron moderating coolant liquid, each said fuel assembly being provided with a plurality of elongated rod-type fuel elements of radius $r$ disposed parallel to one another and spaced apart in a square array from one another by a center to center distance $d_1$ to provide, with the moderating coolant in the inervening space therebetween, a volumetric moderator-to-fuel ratio $R_1$ in the absence of vaporized moderating coolant which is substantially equal to $$\frac{d_1^2 - \pi r^2}{\pi r^2}$$

said fuel assemblies being proportioned with respect to the flow passage dimensions to space the peripheral fuel elements in each assembly apart from the proximate peripheral fuel assembly in the adjacent fuel assembly by a center to center distance $d_4$ through said wall which is substantially equal to $d_1 + t$ and to provide, with the moderating coolant in the intervening spaces therebetween on each side of said wall, a volumetric moderator-to-fuel ratio $R_2$ in the absence of vaporized moderating coolant which is substantially equal to $$\frac{(d_4 - t)^2 - \pi r^2}{\pi r^2}$$

and which is substantially the same as the ratio $R_1$ within said fuel assemblies, a plurality of control poison elements distributed throughout said core structure and reciprocable within said flow passages, the geometric cross sectional area of said control poison elements each being substantially the same as that of an outline drawn around and tangent to the exterior surfaces of the plurality of adjacent fuel elements which would otherwise occupy the space in said core structure in which said control poison element is reciprocable, and a follower element secured to and axially aligned with each of said control poison elements and having substantially the same geometric cross sections as that of said poison element.

7. A chain reacting assembly according to claim 6 wherein said follower element comprises a fuel assembly follower having a plurality of fuel elements equal in number to and axially aligned respectively with said plurality of fuel elements which would otherwise occupy the space in said core structure in which said control poison element is reciprocable.

8. A chain reacting assembly according to claim 6 wherein said follower element comprises a void follower having a geometric cross section which is substantially the same as that of said control poison element, said follower containing a material having a low neutron absorption cross section and substantially no epithermal neutron moderating properties.

9. A chain reacting assembly according to claim 6 in combination with a cellular core support structure having spaced openings therein and supporting said cellular core structure, said tubular flow channels extending into said openings, channel latch elements provided at one end of each channel and adapted to secure said channels removably and individually into said core support structure, and fuel assembly latch elements provided on said fuel assembly and adapted to secure said fuel assemblies removably and individually into said flow passages in and between said plurality of tubular flow channels.

10. An improved nuclear fission chain reacting assembly which comprises a cellular core support structure, a plurality of relatively thin-wall tubular, open-ended, neutron moderating coolant flow channels providing therein a plurality of flow passages and removably supported by and mechanically latched into said support structure and disposed parallel to one another in a corner to corner or checkerboard array, said channels having substantially square geometric cross sections with a fixed width and spaced apart from one another in said array by a distance substantially equal to said width to provide an additional plurality of neutron moderating coolant flow passages between said channels and which have substantially the same square geometric cross section as that of said channels, a shroud surrounding said plurality of flow channels to provide lateral support for said channels and to close the otherwise open sides of the peripheral flow passages between peripheral flow channels in at least said core structure, a nuclear fuel element assembly removably supported and mechanically latched into a sufficient number of said flow passages to maintain a self-sustaining nuclear fission chain reaction in said structure in the presence of a neutron moderating coolant liquid, each said fuel assembly comprising a plurality of elongated rod-type fuel elements in a square array and spaced parallel to and apart from one another by a distance sufficient to provide, with the moderating liquid coolant in the intervening space therebetween, a given moderator-to-fuel atom ratio, said fuel element assemblies being proportioned with respect to said flow passages to space each peripheral fuel element in one assembly apart from the proximate peripheral fuel element in the adjacent fuel assembly by a distance sufficient to provide, with the moderating coolant in the intervening spaces therebetween on each side of said wall, a moderator-to-fuel atom ratio which is substantially the same as that existing within each of said fuel assemblies, each of said fuel elements containing a substantially continuous and uninterrupted body of nuclear fuel material whereby, in the absence of vaporized neutron moderating coolant, the local moderator-to-fuel atom ratio is substantially uniform both radially and axially throughout said chain reacting assembly, a plurality of control poison elements distributed throughout said core structure and reciprocable within said flow passages, the geometric cross sectional area of said control poison elements each being substantially the same as that of an outline drawn around and tangent to the exterior surfaces of the plurality of adjacent fuel elements which would otherwise occupy the space in said core structure in which said control poison element is reciprocable, and a follower element secured to and axially aligned with each of said control poison elements and having substantially the same geometric cross section as that of said poison element.

References Cited in the file of this patent

UNITED STATES PATENTS

| | | |
|---|---|---|
| 2,056,563 | Budd et al. | Oct. 6, 1936 |
| 2,814,717 | Hardesty | Nov. 26, 1957 |
| 2,920,025 | Anderson | Jan. 5, 1960 |
| 2,961,393 | Monson | Nov. 22, 1960 |
| 2,982,712 | Heckman | May 2, 1961 |

FOREIGN PATENTS

| | | |
|---|---|---|
| 781,648 | Great Britain | Aug. 21, 1957 |
| 1,039,659 | Germany | Sept. 25, 1958 |

OTHER REFERENCES

Atomic Energy Commission Document TID 5275, Research Reactors, Aug. 13, 1955, p. 168.

Barnes: Vol. 3, "Proceedings of the International Conference on the Peaceful Uses of Atomic Energy," August 1955, United Nations, N.Y., pp. 335, 338.

Nuclear Power, September 1957, pp. 369–373.

UNITED STATES PATENT OFFICE
CERTIFICATE OF CORRECTION

Patent No. 3,166,481 January 19, 1965

Howard E. Braun

It is hereby certified that error appears in the above numbered patent requiring correction and that the said Letters Patent should read as corrected below.

In the grant, line 1, name of inventor, for "Harold E. Braun" read -- Howard E. Braun --; column 7, line 66, for "bottom hereof. Shoud" read -- bottom thereof. Shroud --; column 10, line 26, for "coroner to corner or checkboard" read -- corner to corner or checkerboard --; column 14, line 56, for "colant" read -- coolant --; column 15, line 71, for "inhces" read -- inches --; column 16, line 52, for "$Pu^{329}$" read -- $Pu^{239}$ --; column 18, line 48, for "inervening" read -- intervening --; column 19, line 48, strike out "at least".

Signed and sealed this 24th day of August 1965.

(SEAL)
Attest:

ERNEST W. SWIDER
Attesting Officer

EDWARD J. BRENNER
Commissioner of Patents